United States Patent

Gurevich et al.

[11] Patent Number: 5,912,451
[45] Date of Patent: Jun. 15, 1999

[54] MOVING BEAM AND FIELD OF VIEW READERS WITH DICHROIC FILTER

[75] Inventors: Vladimir Gurevich, Ronkonkoma; Mark Krichever, Hauppauge; Boris Metlitsky; Paul Dvorkis, both of Stony Brook, all of N.Y.

[73] Assignee: Symbol Technologies, Inc., Holtsville, N.Y.

[21] Appl. No.: 08/969,004

[22] Filed: Nov. 12, 1997

Related U.S. Application Data

[62] Division of application No. 08/538,971, Oct. 5, 1995, Pat. No. 5,744,815.
[51] Int. Cl.⁶ ..................................................... G06K 7/10
[52] U.S. Cl. ...................................... 235/462.35; 235/468
[58] Field of Search ............................... 235/462, 472, 235/468, 462.32, 462.33, 462.35, 462.36, 462.37, 472.01

[56] References Cited

U.S. PATENT DOCUMENTS

| | | | |
|---|---|---|---|
| 4,983,817 | 1/1991 | Dolash et al. | 235/462 |
| 5,401,960 | 3/1995 | Fisun et al. | 235/468 |
| 5,502,304 | 3/1996 | Berson et al. | 235/468 |
| 5,525,798 | 6/1996 | Berson et al. | 235/468 |

*Primary Examiner*—Donald Hajec
*Assistant Examiner*—Drew A. Dunn
*Attorney, Agent, or Firm*—Kirschstein, et al.

[57] ABSTRACT

An optical reader for reading indicia such as bar codes comprises a first and second light source for generating first and second laser beams. The respective laser sources generate light at different wavelengths and a dichroic filter is provided to allow either source to be used without parallax effects. The laser scanner beam can be used to aim the reader when carrying out field of view reading. The optical reader is further provided with a band-pass filter shaped to match the wave-front of light generated at a given location incident on the filter to reduce the band-pass bandwidth and hence the ambient noise. The shaped band-pass filter can be incorporated in the optical reader dichroic filter arrangement.

16 Claims, 5 Drawing Sheets

MOVING BEAM AND FIELD OF VIEW READERS WITH DICHROIC FILTER

This application is a divisional of U.S. patent application Ser. No. 08/538,971, filed Oct. 5, 1995 now U.S. Pat. No. 5,744,815.

BACKGROUND OF THE INVENTION

1. Field of the Invention

The present invention relates to an optical scanner for reading indicia such as bar code symbols and a field of view reader for reading indicia such as bar code symbols. In particular the invention relates to such systems when including dual light sources.

2. Discussion of the Prior Art

Known optical systems for reading an indicia such as bar code symbols comprise a light source, a focusing system for directing a light beam from the light source onto the bar code symbol and a detector for receiving light reflected from the bar code symbol and generating a representative electrical signal. In some cases it is desired to provide a reader capable of reading bar code symbols presented in more than one operating range and accordingly it has been suggested that a first and second light source be provided having different operating ranges. For example, a reader has been suggested comprising a first and second laser diode light source having different operating ranges determined, for example, by respective lens systems. The laser diodes are off-set from one another and a mirror is introduced in order to combine beams from the two lasers. Such a system is known as a dynamic focusing system.

U.S. Pat. No. 4,085,423 discloses an information reproducing apparatus including optical information recording media such as video disks including two laser sources generating light of different wavelengths and a dichroic filter reflecting light of one wavelength and transmitting light of the other wavelength in order that the respective light beams can be used for different purposes.

SUMMARY OF THE INVENTION

It is an object of the present invention to provide a yet further improved combined light source optical reader.

It is a further object of the invention to provide a combined light source optical reader that eliminates parallax effects between beams generated by the light sources.

It is yet a further object of the invention to provide a combined light source optical reader that reduces vignetting of the beams generated by the light sources.

It is a further object of the invention to provide an optical reader capable of reading all 2D symbologies.

It is a further object of the invention to provide an optical reader capable of reading all 2D symbologies that eliminates parallax effects.

It is a further objection of the invention to provide an optical reader with an improved signal to noise ratio.

STATEMENT OF THE INVENTION

According to the present invention there is provided an optical scanner for reading indicia such as bar code symbols, the scanner comprising:

a first light source for generating a first beam for scanning an indicia;

a second light source for generating a second beam for scanning an indicia; and a detector for generating an electrical signal representative of light reflected from the indicia, wherein
the first light beam is in a first polarized orientation, the second beam is in a second polarized orientation orthogonal to the first polarized orientation, and the scanner further comprises a polarizing element provided in the path of the first and second light beams.

Because the first and second light beams are polarized at each of the orthogonal orientations it is possible to provide a combined light beam, using the polarizing element, eliminating the effects of parallax and vignetting.

The polarizing element may comprise a beam splitter. Accordingly a simple and cost-effective means of providing a combined light beam is provided.

The beam splitter may allow total transmittance of light polarized in a first orientation and total reflectance of light polarized in a second, orthogonal orientation.

The beam splitter may totally reflect one of the first and second light beams and totally transmit the other of the first and second light beams to provide a combined beam.

A scanning mirror may be provided in the path of the combined beam. The light sources may comprise laser light sources.

The laser light sources may comprise laser diodes.

The first light source may have a first operating range and the second light source may have a second operating range.

An optical system may be associated with at least one of the light sources to determine the operating range.

An optical element may be associated with the beam splitter for providing different operating ranges for each of the light sources.

According to the invention there is further provided a field of view optical reader for reading indicia such as bar code symbols comprising:

a first light source for generating a first light beam for illuminating an indicia;

a second light source for generating a second light beam for illuminating an indicia; and a detector for generating an electrical signal representative of light reflected from the indicia wherein
the first light beam is in a first polarized orientation;
the second light beam is in a second polarized orientation orthogonal to the first polarization orientation; and the reader further comprises
a polarizing element provided in the path of the first and second beams.

According to the invention there is further provided an optical reader for reading indicia such as bar code symbols, the reader comprising:

a first light source for generating a first beam for illuminating an indicia;

a second light source for generating a second beam for illuminating an indicia; and a detector for generating an electrical signal representative of light reflected from the indicia, wherein
the first light beam is of a first wavelength, the second beam is of a second wavelength and the reader further comprises a dichroic filter provided in the path of the first and second light beams.

An alternative arrangement is thus provided to allow beams to be combined without effects of parallax or vignetting.

According to the invention there is further provided an optical reader for reading 2D indicia comprising:

an optical scanner including a laser source generating a beam of light at a first wavelength;

a field of view optical reader including a laser light source generating a beam at a second wavelength and further including a detector for detecting light reflected from the indicia; and a dichroic filter arranged to allow at least partial transmittance of light of one of the first and second wavelengths and at least partial reflectance of light of the other wavelength.

As a result an arrangement is provided capable of reading all 2D symbologies, whether a scanning arrangement or a field of view arrangement is required to read a symbology. In addition, parallax effects are eliminated.

The dichroic filter may be provided in the path of the light beam from the laser scanner and the field of view detector may be positioned to receive light reflected from the dichroic filter. As a result the light beam generated by the scanner laser may be used to aim the device when the field of view reader is being used.

The field of view optical reader laser source may generate light at a wavelength in the infra red region. Because the field of view reader may be aimed using the scanner laser beam non-visible laser light sources may be used for the field of view reader such as infra red wavelength light emitting diodes, which are more efficient.

The field of view optical reader laser sources may be light emitting diode laser sources.

The scanner laser may generate light at a wavelength of 670 nm and the field of view laser source is an infra red or green/yellow light omitting diode laser source.

The scanner laser may generate light at a wavelength of 635 nm and the field of view laser source may be a 660 nm light emitting diode laser source.

The dichroic filter may allow at least partial transmittance of light having wavelengths in the region of one of the first and second wavelengths and at least partial reflectance of light having wavelengths in the region of the other wavelength. Accordingly the dichroic filter can act as a band pass filter for the laser scanner and/or field of view device.

According to the invention there is further provided an optical reader for reading indicia such as bar code symbols, the reader comprising a light source for generating a first beam for illuminating an indicia;

a receiving collector for light reflected from an indicia; and an optical band-pass filter; wherein the surface of the band-pass filter is shaped to substantially match the wave-front of light incident thereon generated by the light source.

According to the invention there is yet further provided a method of reading an indicia such as a bar code symbol in which a first light source generates a first light beam for illuminating an indicia, a second light source generates a second light beam for illuminating an indicia, the light reflected from the indicia is received by a detector and an electrical signal is generated representative of the received light, wherein the first light beam is polarized in a first orientation, the second light beam is polarized in a second orientation orthogonal to the first orientation, the first light beam is transmitted by a polarized beam splitter and the second light beam is reflected by the polarized beam splitter to provide a combined light beam.

According to the invention there is further provided a method of reading an indicia such as a bar code symbol in which a first light source generates a first light beam for illuminating an indicia, a second light source generates a second light beam for illuminating an indicia, the light reflected from the indicia is received by a detector and an electrical signal is generated respective of the received light, wherein the first light beam is of a first wavelength, the second light beam is of a second wavelength, the first light beam is transmitted by a dichroic filter and the second light beam is reflected by a dichroic filter to provide a combined light beam.

According to the invention there is further provided a method of reading a 2D indicia in which a laser scanner laser source generates a first light beam of a first wavelength for illuminating an indicia, a field of view optical reader laser scanner generates a second light beam of a second wavelength for illuminating an indicia and a dichroic filter is positioned to reflect at least partially light of one of the first and second said wavelengths and transmit at least partially light of the other of said wavelengths to allow light from the laser scanner laser source to be directed onto an indicia and light from said field of view laser source to be reflected from the indicia and directed onto a field of view detector.

BRIEF DESCRIPTION OF THE DRAWINGS

The foregoing objects and advantages of the present invention may be more readily understood by one skilled in the art with reference being had to the following detailed description of several preferred embodiments thereof, taken in conjunction with the accompanying drawings wherein like elements are designated by identical reference numerals throughout the several views, and in which:

FIG. 2b is a schematic view corresponding to FIG. 2a;

FIG. 3b is a schematic view corresponding to FIG. 3a;

FIG. 4b is a schematic view corresponding to FIG. 4a;

FIG. 6b is a schematic view corresponding to FIG. 6a; and

DETAILED DESCRIPTION OF THE PREFERRED EMBODIMENTS

Figure 1:
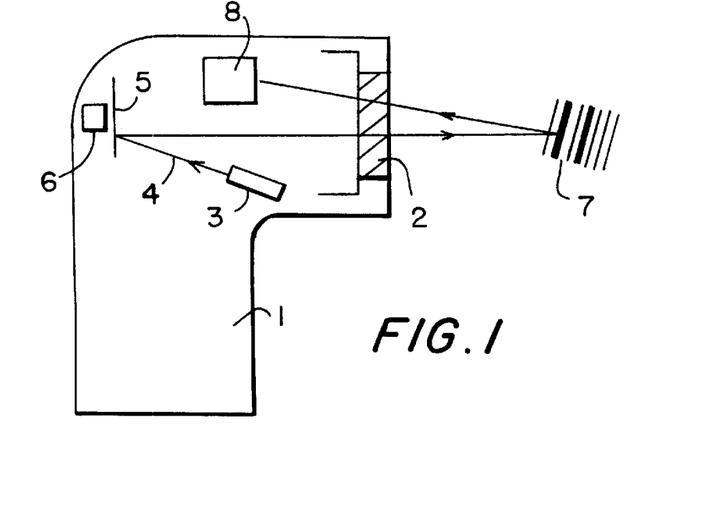
FIG. 1 shows a conventional hand-held bar code scanner.

Referring first to FIG. 1 a conventional bar code scanner includes a housing 1 having a window 2. A light source 3, for example, a laser diode generates a light beam 4 incident on a scanning mirror 5. The scanning mirror 5 is oscillated by a driving means 6 to scan the light beam 4 across a target indicia to be read, for example a bar code symbol 7. Light reflected from the bar code symbol 7 is received by a sensor 8 which generates an electrical signal representative of the light received.

Figure 2A:
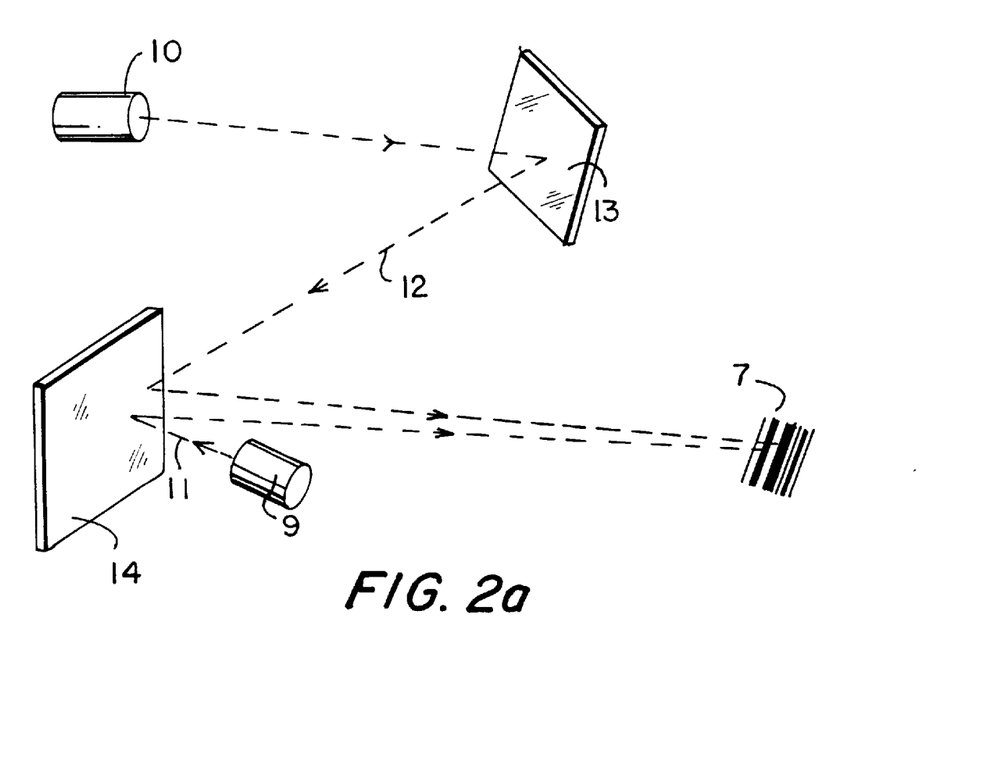
FIG. 2a is a perspective view of a combined laser bar code scanner according to the prior art.
Figure 2B:
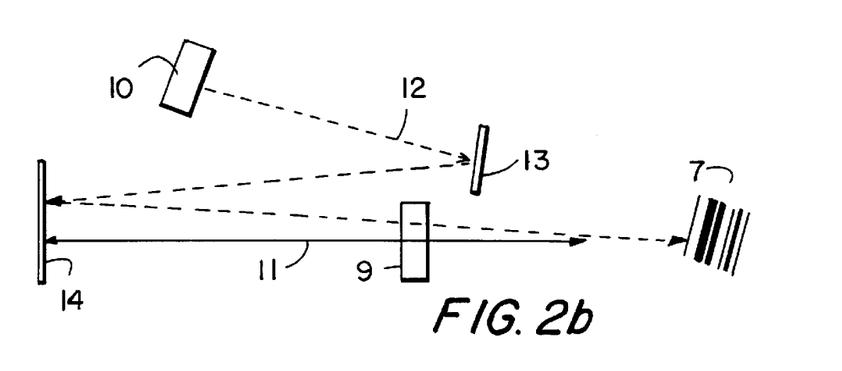

A dynamic focusing system is shown in FIGS. 2a and 2b comprising a first and second laser diode light source 9, 10 respectively generating respective light beams 11 and 12. The light beam 12 generated by laser diode 10 is reflected by an additional mirror 13 and a common mirror 14. The light beam 11 generated by laser diode 9 is also reflected by the common mirror 14 and the respective light beams 11 and 12 are thus effectively combined. However it will be apparent that an element of parallax is introduced by the system and in addition, vignetting of one of the beams, that is, reduction of the useful area of the light beam incident on a target indicia by optical effect, takes place.

Figure 3A:
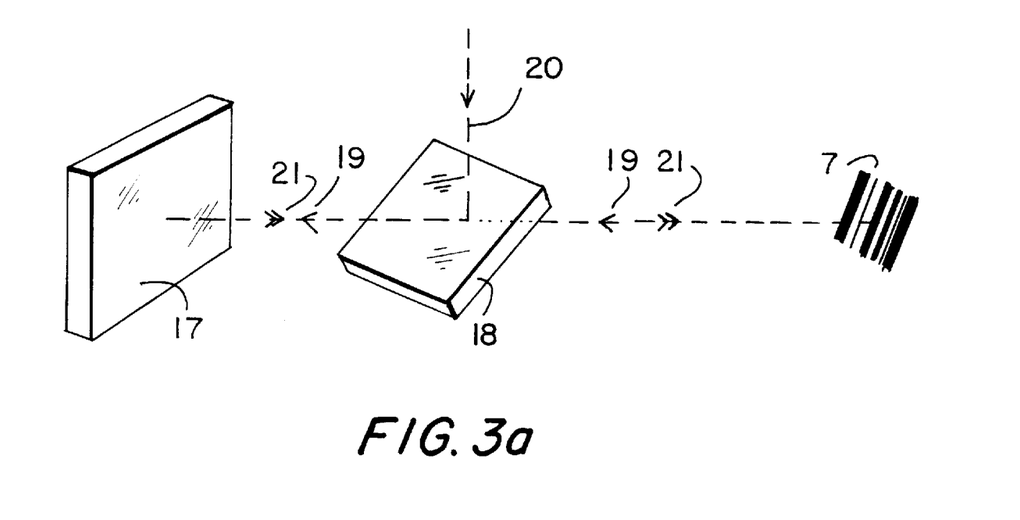
FIG. 3a is a perspective view of a combined laser scanner according to the present invention.
Figure 3B:
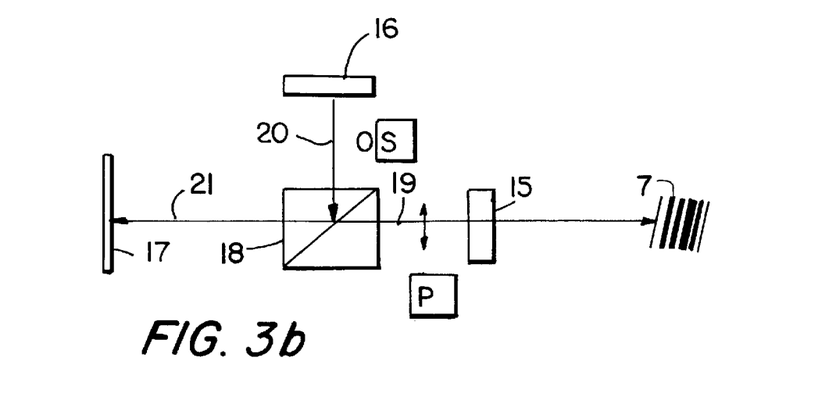

The dual laser system shown in FIGS. 3a and 3b provides an improved arrangement in which the effects of parallax and vignetting are eliminated. The arrangement shown in FIG. 3a comprises a first laser diode 15, a second laser diode 16, a scanning mirror 17 and, interposed between the two laser diodes 15,16 and the scanner mirror 17, a polarized beam splitter 18. The laser diodes may be of a known type and are arranged to produce polarized light. Importantly, however, the respective laser diodes IS,16 are arranged to produce polarized beams at an orientation orthogonal to one another. For example, laser diode 15 can produce a beam 19 of P-polarized light in the plane of the page and laser diode 16 can provide a beam 20 of S-polarized light perpendicular to the plane of the page. The beam splitter is correspondingly arranged to have total transmittance of light polarized in one orientation and total reflectance of light polarized in the orthogonal orientation. For example, the beam splitter 18 may be arranged to allow total transmittance of P-polarized light and total reflectance of S-polarized light. Thus the P-polarized light beam 19 generated by laser diode 15 will be totally transmitted by the beam splitter 18 whilst the S-polarized light beam 20 generated by the laser diode 16 will be totally reflected by the beam splitter 18. The laser beams 19,20 themselves are generated in directions perpendicular to one another and the beam splitter 18 is provided at an angle of 45° at the junction of the two laser beams 19,20. Accordingly a combined laser beam 21 issues from the beam splitter 18. The combined laser beam 21 is directed onto scanning mirror 17 which is mechanically driven to provide a scanning laser beam as described above.

In order for the system to include two operating ranges one of the laser diodes 15, 16 can be a short range laser diode and the other one of the laser diodes 15,16 can be a long range laser diode. The operational ranges of the laser diodes can be varied by providing suitable optical systems (not shown) associated with one, or the other, or both laser diodes 15, 16.

Figure 4A:
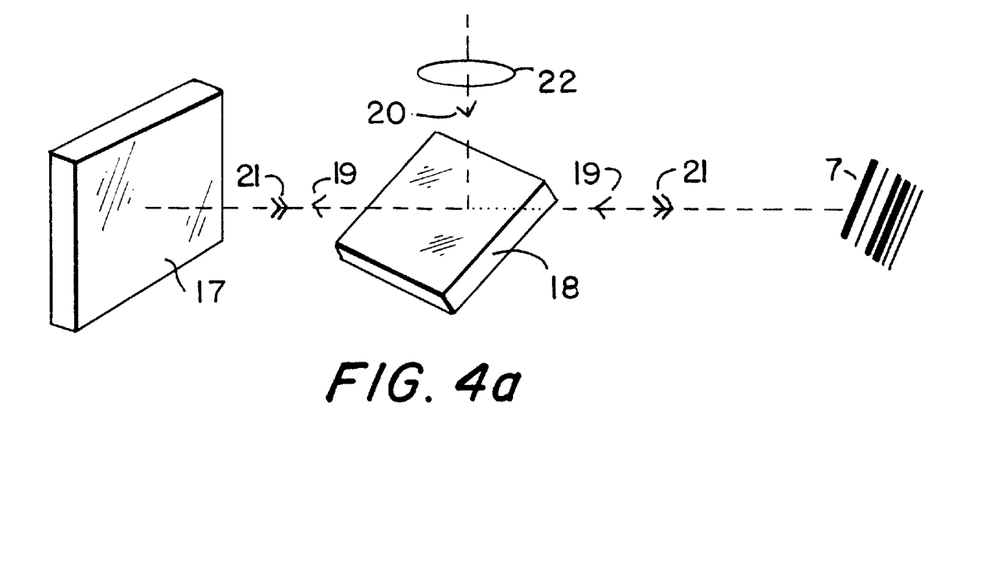
FIG. 4a is a perspective view of a further embodiment of the present invention.
Figure 4B:
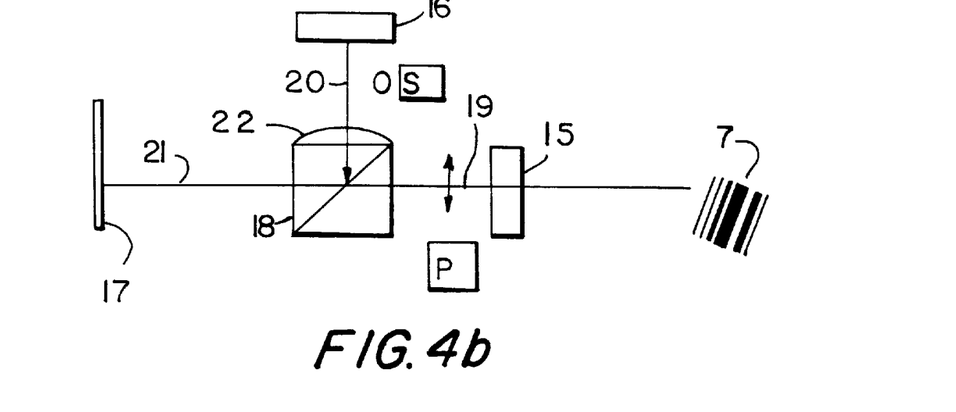

In an alternative arrangement shown in FIGS. 4a and 4b, an optical element such as a lens 22 can be provided associated with the beam splitter 18 such that it is positioned in the path of only one of the laser beams 19,20 generated by the laser diodes 15,16. The lens 22 may be a cylindrical lens. Hence a scanner will be provided having two working ranges determined by the various beams. According to a further alternative (not shown) the beam splitter itself can have a suitable profiled surface, for example, a cylindrical surface to achieve the same effect.

Accordingly the invention provides a beam splitter in which dual lasers are provided and a combined beam is produced without parallax or vignetting effects taking place.

As an alternative to providing a polarized beam splitter 18 a dichroic filter could be used instead. Such a filter allows high transmittance of light at a first wavelength and high reflectance of light at a second wavelength. Accordingly, the respective laser light sources having different operating ranges could be further modified such that they operated at different wavelengths. For example, returning to FIGS. 3a and 3b, if beam splitter 18 were replaced by a dichroic filter allowing high transmittance of light at a wavelength $\lambda_1$ and high reflectance at $\lambda_2$, and if laser source 15 generated light at wavelength $\lambda_1$ and laser source 16 generated light at wavelength $\lambda_2$ the beams would be once again combined at 21 without effects of parallax or vignetting.

Figure 5:
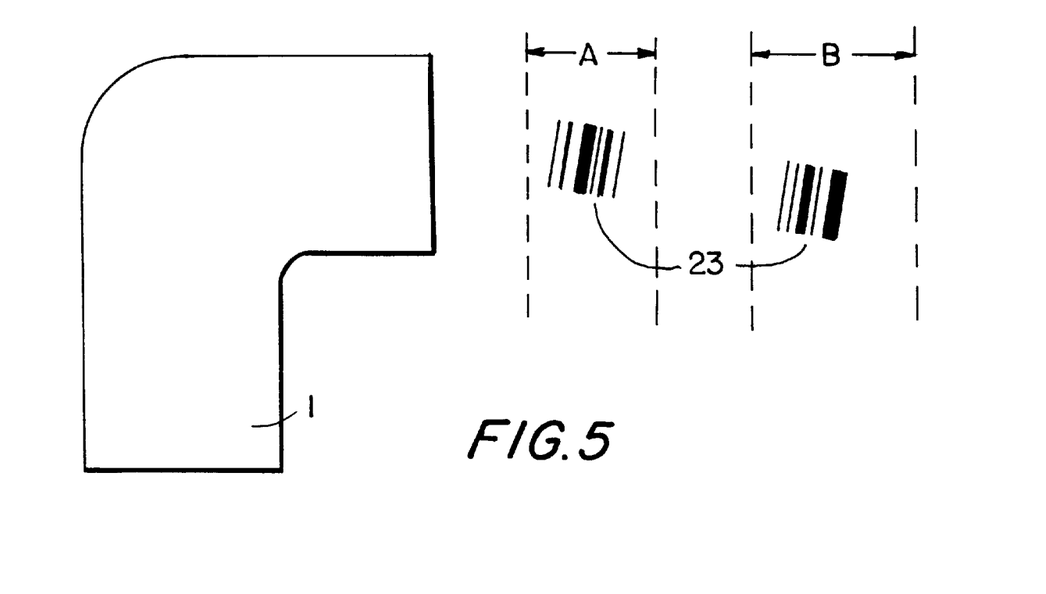
FIG. 5 illustrates the various operational ranges of a scanner according to the present invention.

The varying operational ranges provided by the arrangement described herein are shown in FIG. 5. Where, for example, laser diode 15 has a short operational range and laser diode 16 has a long operational range, the laser scanner will be capable of reading bar code symbols 23 in either of two operating ranges which are designated schematically as A and B. The laser scanner may include means for determining which of the operational ranges is appropriate. For example, a trigger may be provided on the scanner which may be manually actuable by the operator between two positions depending on the operator's judgement of whether the bar code symbol is in the nearer or the further operational range. Alternatively the relevant operational range may be determined automatically, for example, by calculating the dwell time of the scanning beam on elements of the indicia; the dwell time will be shorter for bar code symbols that are further away, and conversely will be longer for bar code symbols that are closer. As a further alternative an infra red or sonar proximity detector may be provided for determining the distance to the bar code symbol.

The bar code scanner may be further arranged to suppress the long range or short range beam when the bar code symbol is detected in the alternative operational range. For example, if the bar code symbol is detected in the further range then the short range laser beam may be suppressed. The suppression may be carried out by providing a further polarizing element in the path of the combined laser beam 21, the further polarizing element being variable between two mutually orthogonal orientations to suppress one or other of the mutually orthogonally oriented polarized beams 19,20. The further polarizing element may, for example, be rotated as appropriate by a driving means controlled by the means for detecting which of the operational ranges is desired, or the further polarizing element may be an electro-optic element suitably controlled. Where a dichroic filter is used in place of the polarized beam splitter, suitable filters could be used to suppress one of the beams of given wavelength.

It will be appreciated that the invention is not limited to the specific embodiment described above. For example, the reader could comprise a static beam, field of view optical reader in which case the scanning mirror 17 would be replaced by a static mirror, and the detector would include a CCD (charge coupled device) array on which an image of the target indicia would be detected. The reader may not be a hand-held scanner but could be a fixed arrangement. The light sources may not be laser diodes but could be any other type of laser or indeed any other light source coupled with suitable polarizing means.

Figure 6A:
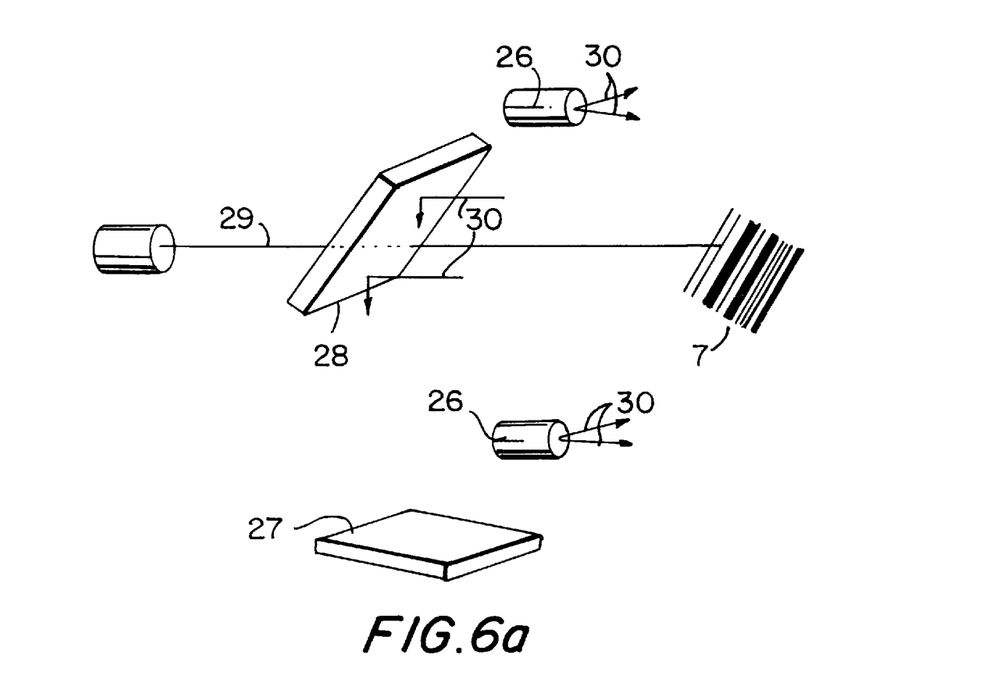
FIG. 6a is a perspective view of an optical reader according to another aspect of the invention.
Figure 6B:
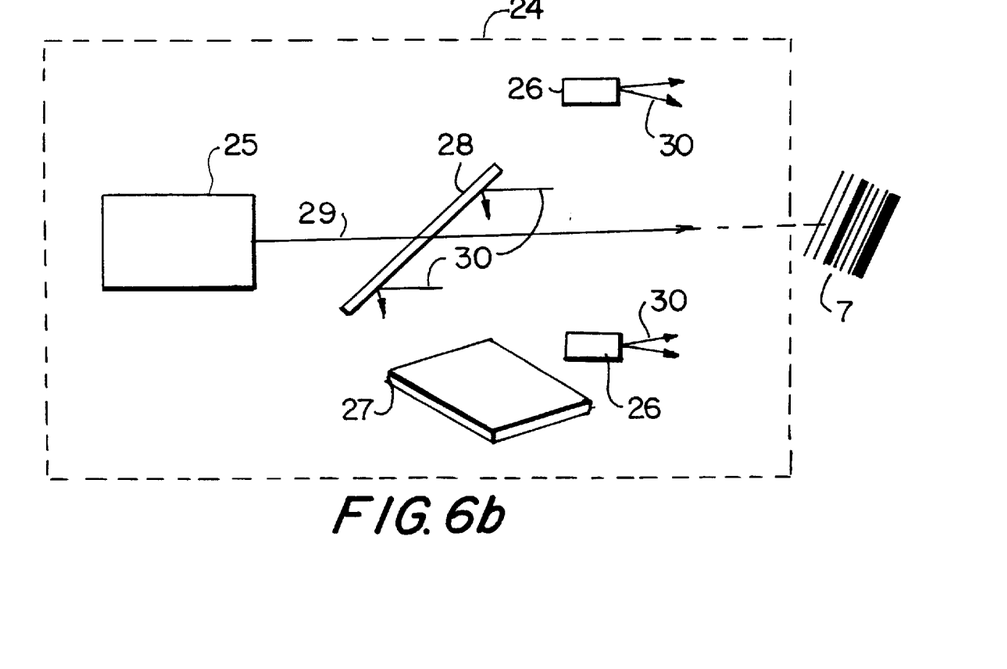

According to another aspect of the invention it may be desired to solve the problem of providing an optical reader capable of reading all 2D symbologies by providing both a flying spot laser scanner and a field of view static beam optical system within a common optical reader. In a further improvement it may be desired to eliminate parallax effects occurring in such an optical reader. A suitable system is illustrated in FIGS. 6a and 6b. An optical reader shown schematically by box 24 comprises a flying spot laser scanner 25 and a field of view reading arrangement including laser sources 26 and a CCD array 27 onto which an image of the indicia to be read is shone. The reader 24 further comprises a dichroic filter 28 which provides a high transmittance of light of a first wavelength ($\lambda_1$) and a high reflectance of light of a second wavelength ($\lambda_2$). Hence where laser scanner 25 generates a beam 29 at wavelength $\lambda_1$ the beam 29 is transmitted by dichroic filter 28 and illuminates the indicia to be read. Field of view laser sources 26 generate a beam 30 of wavelength $\lambda_2$ which illuminates the indicia to be read and is then reflected by the dichroic filter 28 onto the CCD detector 27. Hence, an optical reader 24 is provided capable of reading all 2D symbologies, whether a flying spot scanner or a field of view reader is required and furthermore, owing to the provision of the dichroic filter 28 the optical reader 24 does not suffer from parallax effects.

An additional advantage of the arrangement shown in FIGS. 6a and 6b is that the laser beam 29 generated by laser source 25 may be used to aim the reader at the indicia (by training the laser spot generated by beam 29 on the indicia) when the indicia is being read by the field of view device. As a result it is possible to use a field of view scanner responsive to non-visible light, such as infra red light, which is more efficient. The dichroic filter can also serve as a band pass filter for the scanner, field of view reader, or both wherein the filter provides high reflectance/transmittance only in a predetermined band of wavelength.

As a specific example, the laser scanner source 25 may be a conventional laser generating light at 670 nm and the field of view laser sources 26 may comprise light-emitting diode lasers generating light in the infra red wavelength region, or green/yellow LED's. As a result, the reader can be aimed using the scanner beam at 670 nm as a result of which the more efficient infra red LED's can be used for the field of view reader.

As an alternative specific example the laser scanner source 25 may generate light at 635 nm and the field of view laser sources 26 may comprise 660 nm LED's.

According to a further aspect of the invention an arrangement is provided which solves the problem of improving the signal to noise ratio in a bar code symbol reader system. The performance of such systems may be greatly limited by the ambient noise, for example, extraneous light that will be reflected off bar code symbols and detected by the reader. Where the reader system incorporates an optical band-pass filter the ambient noise is approximately proportional to the band width of the filter, and in the case of dielectric type optical band-pass filters the bandwidth is principally determined by the incident angle of light on the filter, the wavelength shift of light from visible laser diodes and the manufacturing tolerances of the filter itself and other components of the system.

Figure 7:
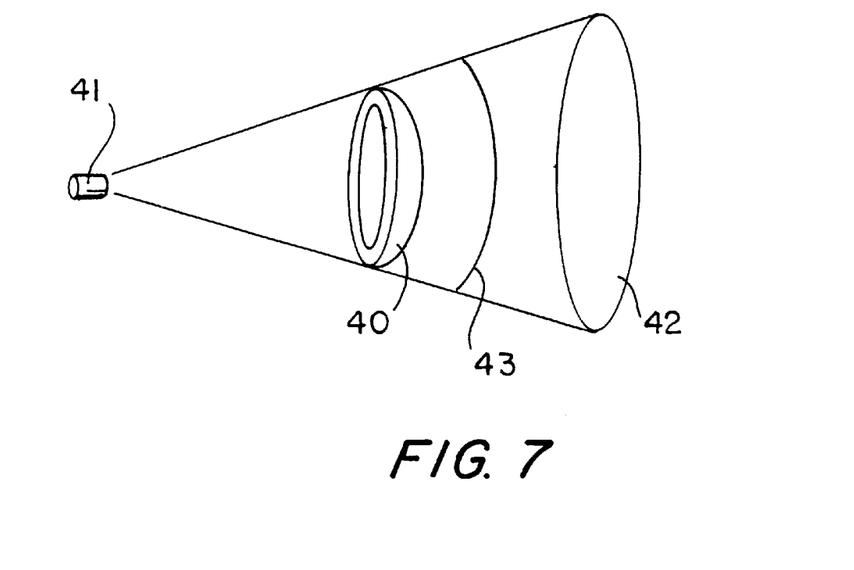
FIG. 7 illustrates a further aspect of the invention.

In order to overcome the problems set out above the arrangement shown in FIG. 7 includes an optical band-pass filter 40 having a dielectric coated surface wherein the shape of the surface of the filter 40 (greatly exaggerated in the drawing) is rendered as close as possible to the shape of the wave-front 43 of light emanating from a given position 41 and incident on the filter. As a result the incident angle on the coated surface is close to zero and the reduction of the bandwidth of the band-pass filter can be reduced according to the following equation:

$$\Delta\lambda = 0.034 \, (\arctan(\tfrac{1}{2}F))^{1.9} \, (nm).$$

In the above equation $\Delta\lambda$ is the band that is expressed in nanometers and F is the F number of a receiving detector or collector 42. Taking the value F=0.8, for example, the bandwidth is reduced by approximately 25 nanometers in the arrangement shown in FIG. 7. In the case of an 80 nm band-pass filter used in a laser scanner that reduction corresponds to an approximate 30% reduction of bandwidth.

As a result the optical spectral efficiency is improved, the signal to noise ratio of the system and the working performance of the system being increased because of the reduction of the bandwidth and the corresponding reduction of the ambient noise. The improved band-pass filter may be incorporated in the dichroic filter arrangement discussed above with reference to FIGS. 6a and 6b.

Without further analysis, the foregoing will so fully reveal the gist of the present invention that others can readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed is:

1. A system for electro-optically reading indicia, comprising:
    a) a dichroic filter having a high transmittance for light of a first wavelength, and a high reflectance for light of a second wavelength;
    b) a moving beam reader including a first light source for directing light at said first wavelength through the dichroic filter to an indicium to be read; and
    c) a field of view reader including a second light source for directing light at said second wavelength to the indicium for reflection therefrom to the dichroic filter, and a detector for detecting the light at said second wavelength reflected off the dichroic filter and for generating an electrical signal indicative of the reflected light at said second wavelength.

2. The system as claimed in claim 1, wherein the light at said first wavelength is visible light to illuminate a visible aiming region on the indicium.

3. The system as claimed in claim 1, wherein the first wavelength is 670 nm.

4. The system as claimed in claim 1, wherein the light at said second wavelength is non-visible light.

5. The system as claimed in claim 1, wherein the second wavelength is 660 nm.

6. The system as claimed in claim 1, wherein the dichroic filter is stationarily mounted in the system.

7. The system as claimed in claim 1, wherein the detector is an array of charge coupled devices generally lying in a plane.

8. The system as claimed in claim 1, wherein the second light source includes a pair of laser diodes spaced apart from each other, each of the diodes being operative for directing a laser beam at said second wavelength to the indicium.

9. A method of electro-optically reading indicia, comprising the steps of:
    a) positioning a dichroic filter having a high transmittance for light of a first wavelength, and a high reflectance for light of a second wavelength, in a reader;
    b) directing light at said first wavelength through the dichroic filter to an indicium to be read;
    c) directing light at said second wavelength to the indicium for reflection therefrom to the dichroic filter; and
    d) detecting the light at said second wavelength reflected off the dichroic filter and generating an electrical signal indicative of the reflected light at said second wavelength.

10. The method as claimed in claim 9, wherein the light at said first wavelength is visible light to illuminate a visible aiming region on the indicium.

11. The method as claimed in claim 9, wherein the first wavelength is 670 nm.

12. The method as claimed in claim 9, wherein the light at said second wavelength is non-visible light.

13. The method as claimed in claim 9, wherein the second wavelength is 660 nm.

14. The method as claimed in claim 9, wherein the dichroic filter is stationarily mounted in the reader.

15. The method as claimed in claim 9, wherein the detector is an array of charge coupled devices generally lying in a plane.

16. The method as claimed in claim 9, wherein the second light source includes a pair of laser diodes spaced apart from each other, each of the diodes being operative for directing a laser beam at said second wavelength to the indicium.

* * * * *